US012610257B2

(12) United States Patent
Lin et al.

(10) Patent No.: US 12,610,257 B2
(45) Date of Patent: Apr. 21, 2026

(54) AUTOMATED WIRELESS RADIO CONFIGURATION

(71) Applicant: Juniper Networks, Inc., Sunnyvale, CA (US)

(72) Inventors: May Zar Lin, San Jose, CA (US); Jacob Thomas, Saratoga, CA (US); Wenfeng Wang, Cupertino, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 571 days.

(21) Appl. No.: 18/148,830

(22) Filed: Dec. 30, 2022

(65) Prior Publication Data

US 2024/0224075 A1     Jul. 4, 2024

(51) Int. Cl.
    *H04W 24/02*          (2009.01)
(52) U.S. Cl.
    CPC .................................. *H04W 24/02* (2013.01)
(58) Field of Classification Search
    CPC .................................................... H04W 24/02
    See application file for complete search history.

(56) References Cited

U.S. PATENT DOCUMENTS

| | | | |
|---|---|---|---|
| 8,160,508 B2 * | 4/2012 | Prise .................. | H04W 72/541 |
| | | | 455/563 |
| 8,983,470 B1 | 3/2015 | Ryan et al. | |
| 9,445,239 B2 * | 9/2016 | Reddy .................. | H04W 4/025 |
| 9,729,439 B2 | 8/2017 | MeLampy et al. | |

| | | | |
|---|---|---|---|
| 9,729,682 B2 | 8/2017 | Kumar et al. | |
| 9,762,485 B2 | 9/2017 | Kaplan et al. | |
| 9,832,082 B2 | 11/2017 | Dade et al. | |
| 9,871,748 B2 | 1/2018 | Gosselin et al. | |
| 9,985,883 B2 | 5/2018 | MeLampy et al. | |
| 10,063,417 B2 * | 8/2018 | Poola .................. | H04L 63/0876 |
| 10,200,264 B2 | 2/2019 | Menon et al. | |
| 10,277,506 B2 | 4/2019 | Timmons et al. | |
| 10,341,897 B1 * | 7/2019 | Linkola ............. | H04W 28/0226 |

(Continued)

OTHER PUBLICATIONS

Response to Extended Search Report dated Aug. 21, 2023, from counterpart European Application No. 23159463.1 filed Jan. 2, 2025, 20 pp.

(Continued)

*Primary Examiner* — Guang W Li
(74) *Attorney, Agent, or Firm* — Shumaker & Sieffert P.A.

(57)                ABSTRACT

Techniques are described for automatically configuring one or more settings of wireless radios within access point (AP) devices at a site based on wireless radio configuration settings for wireless radios within AP devices at manually tuned sites, i.e., "golden sites." The techniques may automatically configure channel bandwidth settings of the wireless radios within the AP devices to optimize performance of wireless networks at the site. A system monitors operational parameters of the wireless radios within the AP devices at a site, identifies a class of wireless radios within AP devices at the golden sites that have similar operational parameters as one or more wireless radios within a particular AP device at the site, and automatically configures the settings of the wireless radios within the particular AP device at the site based on the settings associated with the identified class of wireless radios within AP devices at the golden sites.

20 Claims, 8 Drawing Sheets

(56) References Cited

U.S. PATENT DOCUMENTS

| | | | |
|---|---|---|---|
| 10,432,522 B2 | 10/2019 | Kaplan et al. | |
| 10,448,244 B2 * | 10/2019 | May | H04W 24/02 |
| 10,756,983 B2 | 8/2020 | Ratkovic et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi et al. | |
| 10,992,543 B1 * | 4/2021 | Rachamadugu | H04L 41/145 |
| 11,075,824 B2 | 7/2021 | McCulley et al. | |
| 11,671,848 B2 * | 6/2023 | Hmimy | H04W 24/02 |
| | | | 455/446 |
| 2012/0004001 A1 * | 1/2012 | Power | H04W 24/02 |
| | | | 455/507 |
| 2016/0134469 A1 * | 5/2016 | Carter | H04W 76/14 |
| | | | 370/254 |
| 2017/0013632 A1 * | 1/2017 | Bercovich | H04W 72/23 |
| 2021/0058934 A1 * | 2/2021 | Jiang | H04W 72/30 |
| 2021/0105579 A1 | 4/2021 | Akkarakaran et al. | |
| 2021/0273852 A1 * | 9/2021 | Horne | H04W 24/02 |
| 2021/0306201 A1 * | 9/2021 | Wang | H04L 41/064 |
| 2022/0182911 A1 * | 6/2022 | Eklöf | H04W 72/23 |
| 2022/0394487 A1 * | 12/2022 | Cizdziel | H04W 16/10 |
| 2023/0096022 A1 * | 3/2023 | Dass | H04W 76/18 |
| | | | 370/328 |
| 2023/0199519 A1 * | 6/2023 | Singh | H04W 28/16 |
| | | | 455/414.1 |
| 2024/0014831 A1 * | 1/2024 | Parker | H04B 1/0003 |
| 2024/0137289 A1 * | 4/2024 | Wu | H04L 43/08 |

OTHER PUBLICATIONS

Extended Search Report from counterpart European Application No. 23159463.1 dated Aug. 21, 2023, 10 pp.

* cited by examiner

AUTOMATED WIRELESS RADIO CONFIGURATION

TECHNICAL FIELD

The disclosure relates generally to computer networks and, more specifically, to radio resource management in wireless networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

The IEEE 802.11 standard defines operation for wireless networks in the 2.4 GHz, 5 GHz, and 6 GHz frequency ranges (also referred to as frequency bands). In general, the Wi-Fi spectrum is dived into channels of 20 MHz. In some scenarios, channels may be aggregated into wider channels to increase data transfer speeds. The 2.4 GHz frequency range supports up to three 20 MHz channels and a single channel having a bandwidth of 40 MHz. The 5 GHz frequency range supports channel widths of 20 MHz, 40 MHz, or 80 MHz. The 6 GHz frequency range supports channel widths of 20 MHz, 40 MHZ, 80 MHz, or 160 MHZ.

SUMMARY

In general, this disclosure describes techniques for automatically configuring one or more settings of wireless radios within access point (AP) devices of wireless networks at a site based on wireless radio configuration settings for wireless radios within AP devices of wireless networks at tuned sites (e.g., whether manually or automatically tuned), referred to herein as "golden sites." In particular, the techniques of this disclosure may be used to automatically configure channel bandwidth settings of the wireless radios within the AP devices in order to optimize performance of the wireless networks at the site. The disclosure, however, is not limited in this respect. In some examples, the disclosed techniques may be used to automatically configure other wireless radio settings for AP devices, such as transmission power settings per frequency band.

A network management system (NMS) or other computing device responsible for managing wireless networks at a plurality of sites may leverage knowledge of wireless radio configuration settings for AP devices of wireless networks at one or more golden sites to automatically configure settings of wireless radios within AP devices of wireless network at one or more untuned sites. The NMS continuously monitors parameters of the AP devices across the plurality of sites, referred to herein as "operational parameters." The operational parameters may include, but are not limited to, AP features of the wireless networks or sites and client device behavior observed at the AP devices, the environment in which the AP device operates, and/or other measurable parameters associated with devices of the wireless networks or sites. To automatically configure one or more settings, such as channel bandwidth settings, of wireless radios within any of the AP devices at untuned or non-golden sites, the NMS is configured to identify a wireless radio within an AP device or a class of wireless radios within AP devices at the golden sites that have similar operational parameters as one or more wireless radios within a particular AP device at the untuned site. The NMS then automatically configures the settings of the wireless radios within the particular AP device at the untuned site based on the wireless radio configuration settings associated with the identified class of wireless radios within AP devices at the golden sites. The NMS may initially configure the settings of the wireless radios within an AP device to nominal values during installation of the AP device at an untuned site and subsequently automatically configure the settings of the wireless radios within the AP device in response to the installation. Alternatively, or additionally, the NMS may automatically configure or reconfigure the settings of the wireless radios within the AP device after installation at the untuned site in response to detecting one or more trigger conditions.

The techniques of the disclosure may provide one or more technical advantages and practical applications. For example, the techniques provide automatic configuration of one or more wireless radio settings of AP devices without requiring manual configuration of the AP devices at certain sites and without requiring dedicated resources and/or experts to determine the optimal wireless radio configuration settings for the certain sites. The disclosed techniques utilize a clustering model to identify a class of similar wireless radios within AP devices at the golden sites that operate under similar conditions as one or more wireless radios within a particular AP device at an untuned site and then leverages the optimal, expert-determined configurations of the wireless radios within the AP devices at the golden sites to automatically configure the wireless radio settings of the one or more wireless radios within the particular AP device at the untuned site. In addition, the techniques provide ongoing, dynamic configuration or reconfiguration of the wireless radio settings for wireless radios within AP devices at untuned sites in response to manual or automatic trigger conditions. In this way, the techniques ensure continued optimal wireless network performance at the untuned sites even as operational conditions of the wireless radios within AP devices at the untuned sites change over time without requiring labor intensive manual fine-tuning of the wireless radio configuration settings of the wireless radios within the AP devices at each site. By optimizing the performance of each wireless radio within each AP, and as such the performance of wireless networks on untuned or non-golden sites, the disclosed techniques both reduce the cost of provisioning Wi-Fi networks as well automatically and dynamically maintain optimal network operations under changing operational conditions.

In one example, the disclosure is directed to a system comprising a memory and one or more processors in communication with the memory. The one or more processors are configured to monitor operational parameters of wireless radios within a plurality of AP devices of wireless networks at a site: identify a class of wireless radios within AP devices at golden sites that have similar operational parameters as one or more wireless radios within a particular AP device at the site: and automatically configure one or more settings of the one or more wireless radios within the particular AP device at the site based on wireless radio configuration settings associated with the identified class of wireless radios within AP devices at the golden sites.

In another example, the disclosure is directed to a method comprising monitoring, by a computing system, operational parameters of wireless radios within a plurality of AP devices of wireless networks at a site, identifying a class of wireless radios within AP devices at golden sites that has similar operational parameters as one or more wireless radios within a particular AP device at the site, and automatically configuring one or more settings of one or more wireless radios within the particular AP device at the site based on wireless radio configuration settings associated with the identified class of wireless radios within AP devices at the golden sites.

In a further example, this disclosure is directed to a computer-readable medium storing instructions that, when executed, cause one or more processors to monitor operational parameters of wireless radios within a plurality of AP devices of wireless networks at a site; identify a class of wireless radios within AP devices at golden sites that has similar operational parameters as one or more wireless radios within a particular AP device at the site: and automatically configure one or more settings of the one or more wireless radios within the particular AP device at the site based on wireless radio configuration settings associated with the identified class of wireless radios within AP devices at the golden sites.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
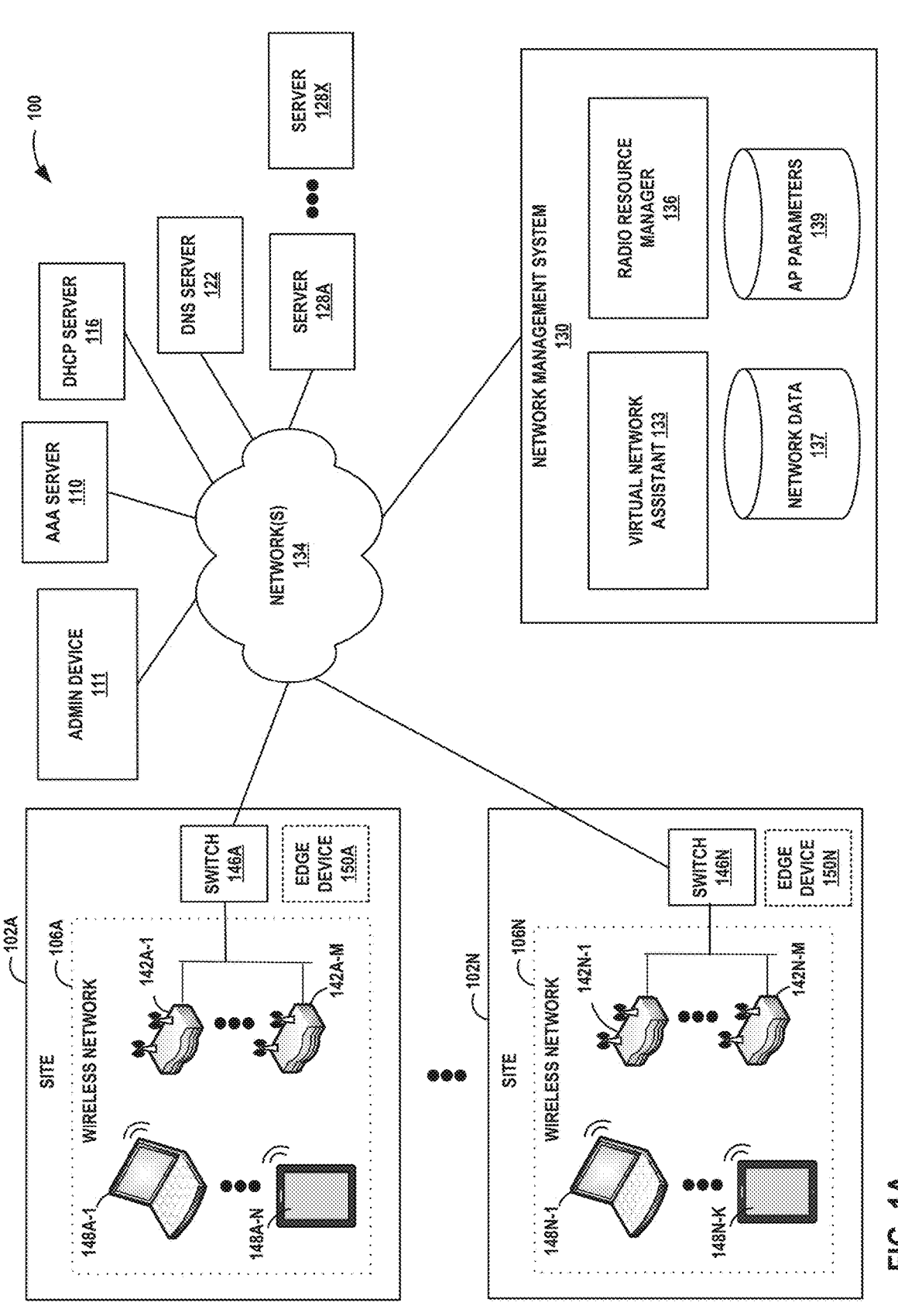
FIG. 1A is a block diagram of an example network system including a network management system, in accordance with one or more techniques of the disclosure.

FIG. 1A is a block diagram of an example network system 100 including network management system (NMS) 130, in accordance with one or more techniques of this disclosure.

Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown). For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to a wired network and is capable of providing wireless network access to client devices within the site.

To provide wireless networks 106 at sites 102, wireless radios within APs 142 are configured for wireless communication in one or more wireless frequency bands. Each of APs 142 may include one or more wireless radios. In some examples, a given one of APs 142 may include three wireless radios. The wireless frequency bands may include, but are not limited to, a 2.4 GHz frequency band, a 5 GHz frequency band, a 6 GHz frequency band, and/or any other lower or higher frequency bands. Each frequency band is divided into a plurality of channels. At any given time, each of APs 142 is assigned to operate (e.g., transmit and receive wireless signals) on a specific one of the plurality of channels. The channel assignments may be carried out by, for example, radio resource management module 134 of network management system (NMS) 130 or another computing device configured to manage radio resources in a wireless network of sites 102. In general, each of the channels has a bandwidth of 20 MHZ. In some scenarios, channels may be aggregated into wider channels to increase data transfer speeds. For example, the 2.4 GHz frequency range supports up to three 20 MHz channels and a single channel having a bandwidth of 40 MHZ. The 5 GHz frequency range supports channel widths of 20 MHZ, 40 MHZ, or 80 MHZ. The 6 GHZ frequency range supports channel widths of 20 MHZ, 40 MHZ, 80 MHZ, or 160 MHZ.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network 100 are coupled together via one or more network (s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the network access server (NAS) devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150) may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., telemetry data, network statistics, operational parameters, and/or one or more service level experience (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues.

VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 observes, collects and/or receives network data 137, which may include telemetry data, network statistics, operational parameters, and/or one or more SLE metrics extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with the techniques described in this disclosure, NMS 130 includes a radio resource manager (RRM) 136 to automatically configure one or more settings of wireless radios within AP devices 146 of wireless networks 106 at an untuned site of sites 102 based on wireless radio configuration settings for AP devices 146 of wireless networks 106 at tuned sites of sites 102, referred to herein as "golden sites." For purposes of illustration, site 102A of FIG. 1A may be considered a golden site and site 102N may be considered an untuned site. In this example, the configurations of golden site 102A are closely monitored and manually adjusted by dedicated experts such that AP devices 142A at golden site 102A may be assumed to provide close to optimal performance and SLEs to the end users, e.g., client devices 148A, at golden site 102A. The configurations of golden site 102A may serve as a template for automating the configurations of other sites 102 managed by NMS 130. In this way, NMS 130 and RRM 136 may leverage knowledge of the wireless radio configuration settings for AP devices 142A of wireless network 106A at golden sites 102A to automatically configure settings of wireless radios within, e.g., AP devices 142N of wireless network 106N at untuned site 102N.

In some examples, RRM 136 may be used to automatically configure channel bandwidth settings of the wireless radios within the AP devices in order to optimize performance of the wireless networks at the site. For example, RRM 136 may automatically configure the wireless radios of the AP device to have channel widths of 20 MHZ, 40 MHZ, or 80 MHz for the 5 GHz frequency range or channel widths of 20 MHZ, 40 MHZ, 80 MHZ, or 160 MHz for the 6 GHz frequency range. The disclosure, however, is not limited in this respect. In some examples, RRM 136 may be used to automatically configure other wireless radio settings for AP devices, such as transmission power settings per frequency.

With respect to the channel bandwidth settings, the IEEE 802.11 standard defines operation for wireless networks in both the 2.4 GHZ and 5 GHz frequency ranges. In the United States, the Federal Communications Commission (FCC) allocates spectrum in both bands for wireless communication and has recently expanded that spectrum allocation to include 6 GHZ. In general, the Wi-Fi spectrum is divided into channels of 20 Mhz. However, channels in the 5 GHz spectrum can be aggregated into wider channels of 40 MHz or 80 MHz. Similarly, the 6 GHz frequency range can be divided into wider channels of 40 MHZ, 80 MHZ, or 160 MHz. The width of a Wi-Fi channel dictates how much data can pass through the channel and at what speed the data can pass through the channel. For example, when communication is not impacted by interference, wider channels are usually associated with more data transferred at faster speeds. However, when a wide channel width, e.g., 80 MHz, is selected, the system has fewer channels to use in the frequency range. When more users utilize a network with less channels, the probability of co-interference and packet collision increases, resulting in network performance degradation.

The plurality of channel bandwidth configuration options introduces a need to determine the optimal channel bandwidth configuration for each one of sites 102. Conventionally, since each site has unique use cases and demands, dedicated resources and/or skilled experts are required to manually tune settings of wireless radios within AP devices at a given site in order determine the optimal wireless radio configuration settings for the wireless networks at the given site. This labor-intensive, manual fine-tuning of the wireless radio configuration settings for APs at a site is slow and expensive, particularly when applied across many sites of a large organization. Due to the expense, the manual site configuration may be left static despite the dynamic nature of network operational conditions and/or parameters. However, as the operational conditions of a wireless network change over time, the previously determined optimal wireless radio configuration settings for APs of the wireless network may no longer be optimal for the wireless network's current operational conditions.

The techniques of this disclosure extend the capabilities of RRM 136 of NMS 130, which may automatically configure certain settings at AP devices 142, such channel/power balance, and dynamically handle interference and client device usage at the AP devices 142. According to the disclosed techniques, RRM 136 automatically configures one or more settings of wireless radios within AP devices 146N of wireless networks 106N at an untuned site 102N based on wireless radio configuration settings for AP devices 146A of wireless networks 106A at golden site 146A. The wireless radio settings may include channel bandwidth settings and/or transmission power settings per frequency band.

NMS 130 continuously monitors operational parameters of AP devices 142 ("AP parameters 139") across the plurality of sites 102. AP parameters 139 may include, but are not limited to, AP features of the wireless networks 106 or sites 102 (e.g., number of APs, AP models, AP density) and client device behavior observed at the APs 142 (e.g., a number of client devices associated with each AP, client device type, client device usage (e.g., number of packets received/sent to clients by each AP, number of receive/send errors), client device roaming (e.g., number of mobility events), client device temporal patterns). In further examples, AP parameters 139 may include configuration parameters at the APs 142, such as configurable settings of APs 142 (e.g., channels, bandwidth, transmission power). In other examples, AP parameters 139 may include measurable parameters including, but not limited to, a number of receiving errors of each AP radio, a number of transmission errors, a number of transition errors of each AP radio, bandwidth used by each AP radio, and/or other measurable parameters. In some cases, NMS 130 may extract AP parameters 139 from network data 137 collected from APs 142 and other network devices at sites 102.

To automatically configure one or more settings, such as channel bandwidth settings, of wireless radios within APs 142N at untuned or non-golden site 102N, RRM 136 of NMS 130 is configured to identify a class of wireless radios within AP devices 142A at golden site 102A that have similar operational parameters as one or more wireless radios within a particular AP device, e.g., AP 142N-1, at untuned site 102N. In some examples, RRM 136 may use a clustering or similarity model maintained by an AI engine to identify the class of wireless radios within AP devices 142A at golden site 102A having a highest level of similarity with the AP operational parameters 139 of the one or more wireless radios within the particular AP device 142N-1 at untuned site 102N from among a plurality of classes of wireless radios within AP devices 142A at golden site 102A. RRM 136 then automatically configures the settings of the wireless radios within the particular AP device 142N-1 at untuned site 102N based on the wireless radio configuration settings associated with the identified class of wireless radios within AP devices 142A at golden site 102A. In some examples, RRM 136 may perform the automated configuration of wireless radio settings individually for each AP device 142N at untuned site 102N, i.e., an AP-specific configuration. In other examples, RRM 136 may perform a site-specific configuration such that the wireless radio configuration settings identified for the particular AP device 142N-1 at untuned site 102N are applied to similar AP devices 142N at untuned site 10N.

In some scenarios. RRM 136 sends a configuration command to the particular AP device 146N-1 at untuned site 102N that includes an indication of values of the wireless radio configuration settings associated with the identified class of similar wireless radios within AP devices 142A at golden site 102A. For example, the values of the wireless radio configuration settings may include a channel width setting for one or more frequency ranges in which the particular AP device 142N-1 is capable of operating, e.g., 20 MHZ. 40 MHZ, or 80 MHz for the 5 GHz frequency range and/or 20 MHZ. 40 MHZ, 80 MHZ, or 160 MHZ for the 6 GHZ frequency range. In other scenarios. RRM 136 may output a configuration recommendation for the particular AP device 142N-1 at untuned site 102N to an administrator of untuned site 102N, e.g., via admin device 111. The configuration recommendation may include an indication of values of the wireless radio configuration settings associated with the identified class of wireless radios within AP devices 142A at the golden site 102A for use to configure the one or more wireless radios within the particular AP device 142N-1 at untuned site 102N.

RRM 136 may automatically configure the settings of the wireless radios within AP devices 142N in response to installation of the AP devices 142N at untuned site 102N. Alternatively, or additionally. RRM 136 may automatically configure or reconfigure the settings of the wireless radios within the AP devices 142N after installation at untuned site 102N in response to detecting one or more trigger conditions. For example, RRM 136 may automatically reconfigure a wireless radio within the particular AP device 142N-1 at untuned site 102N in response to detecting at least one change in AP parameters 139 of the wireless radio within the particular AP device or other AP devices 146N at untuned site 102N (e.g., the wireless radio within the particular AP device no longer operates under the operational conditions similar to the class of wireless radios within AP devices at the golden site), or in response to detecting at least one change to the wireless radio configuration settings associated with the identified class of wireless radios within AP devices 142A at golden site 102A. In other examples, RRM 136 may automatically reconfigure the one or more wireless radios within the particular AP device 142N-1 at untuned site 102N in response to a scheduled or periodic reconfiguration request or an ad-hoc reconfiguration request that is manually initiated by an administrator of untuned site 102N, e.g., via admin device 111.

The techniques of the disclosure may provide one or more technical advantages and practical applications. For example, the techniques provide automatic configuration of one or more wireless radio settings of AP devices without requiring manual configuration of the AP devices at certain sites and without requiring dedicated resources and/or experts to determine the optimal wireless radio configuration settings for the certain sites. The disclosed techniques utilize a clustering or a similarity model to identify a class of wireless radios within AP devices at the golden sites that operate under similar conditions as one or more wireless radios within a particular AP device at an untuned site and then leverages the optimal, expert-determined configurations of the wireless radios within the AP devices at the golden sites to automatically configure the wireless radio settings of the particular AP device at the untuned site. In addition, the techniques provide ongoing, dynamic configuration or reconfiguration of the wireless radio settings for AP devices at untuned sites in response to manual or automatic trigger conditions. In this way, the techniques ensure continued optimal wireless network performance at the untuned sites even as operational conditions of wireless radios within the AP devices at the untuned sites change over time without requiring labor intensive manual fine-tuning of the wireless radio configuration settings of the AP devices at each site. By optimizing the performance of each wireless radio within each AP, and as such the performance of wireless networks on untuned or non-golden sites, the disclosed techniques both reduce the cost of provisioning Wi-Fi networks as well automatically and dynamically maintain optimal network operations under changing operational conditions.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
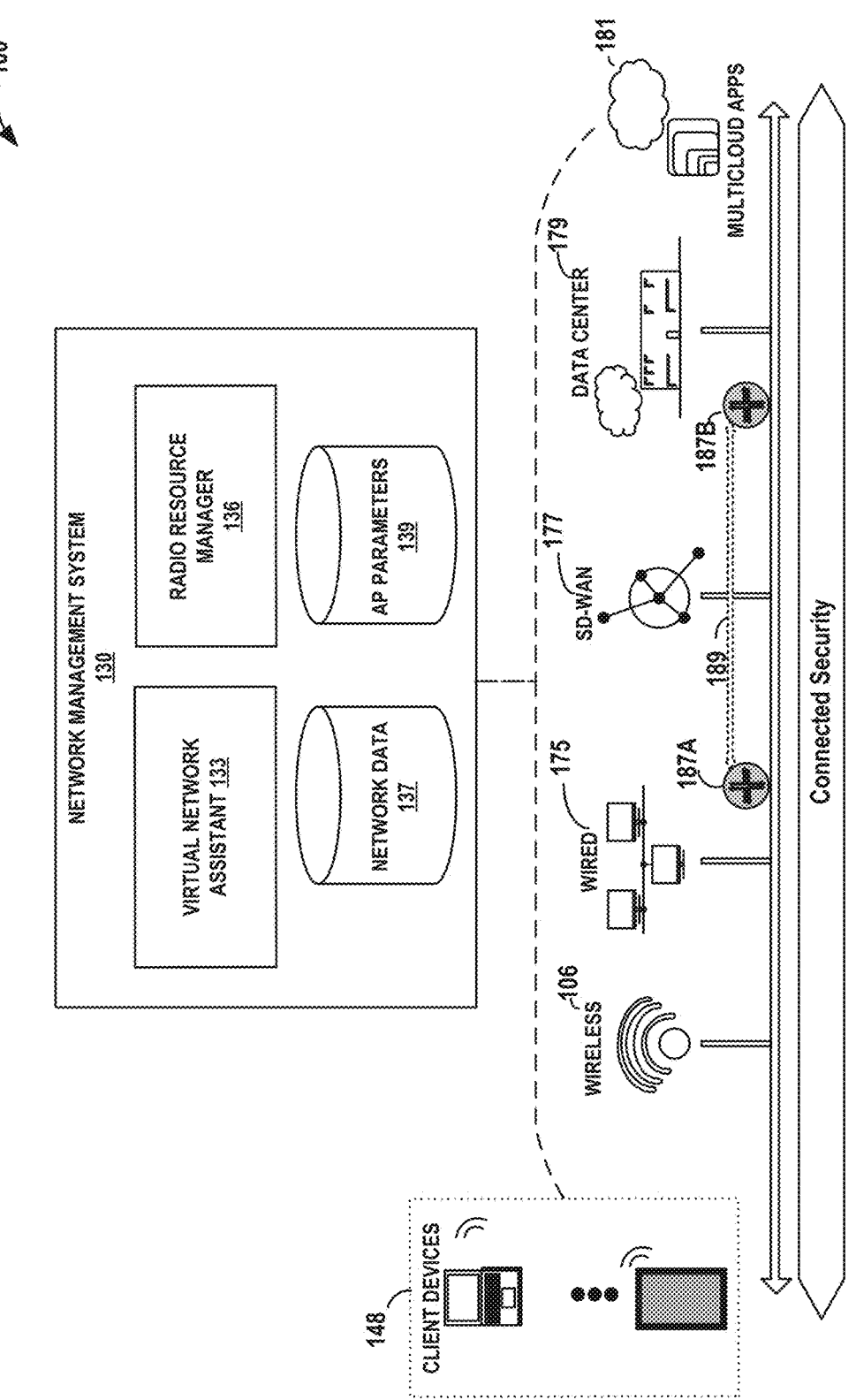
FIG. 1B is a block diagram illustrating further example details of the network system of FIG. 1A.

FIG. 1B is a block diagram illustrating further example details of the network system of FIG. 1A. In this example. FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from "client," e.g., user devices 148 connected to wireless network 106 and wired LAN 175 (far left of FIG. 1B), to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A. 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks. Inc.

Additional information with respect to session-based routing and SVR is described in U.S. Pat. No. 9,729,439, entitled "COMPUTER NETWORK PACKET FLOW CONTROLLER." and issued on Aug. 8, 2017: U.S. Pat. No. 9,729,682, entitled "NETWORK DEVICE AND METHOD FOR PROCESSING A SESSION USING A PACKET SIGNATURE." and issued on Aug. 8, 2017: U.S. Pat. No. 9,762,485, entitled "NETWORK PACKET FLOW CONTROLLER WITH EXTENDED SESSION MANAGEMENT." and issued on Sep. 12, 2017; U.S. Pat. No. 9,871, 748, entitled "ROUTER WITH OPTIMIZED STATISTICAL FUNCTIONALITY." and issued on Jan. 16, 2018: U.S. Pat. No. 9,985,883, entitled "NAME-BASED ROUTING SYSTEM AND METHOD." and issued on May 29, 2018: U.S. Pat. No. 10,200,264, entitled "LINK STA- TUS MONITORING BASED ON PACKET LOSS DETECTION." and issued on Feb. 5, 2019; U.S. Pat. No. 10,277,506, entitled "STATEFUL LOAD BALANCING IN A STATELESS NETWORK." and issued on Apr. 30, 2019; U.S. Pat. No. 10,432,522, entitled "NETWORK PACKET FLOW CONTROLLER WITH EXTENDED SESSION MANAGEMENT." and issued on Oct. 1, 2019; and U.S. Pat. No. 11,075,824, entitled "IN-LINE PERFORMANCE MONITORING." and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, RRM 136 of NMS 130 continuously monitors AP parameters 139 of AP devices of wireless networks 106 across the plurality of sites. RRM is configured to identify a class of wireless radios within AP devices of wireless networks 106 at one or more golden sites that have similar AP parameters 139 as one or more wireless radios within a particular AP device of wireless networks 106 at an untuned site. RRM 136 may use a clustering or a similarity model maintained by an AI engine to identify the class of wireless radios within AP devices at the golden sites having a highest level of similarity with the AP parameters 139 of the one or more wireless radios within the particular AP device at the untuned site. RRM 136 then automatically configures the settings of the one or more wireless radios within the particular AP device of wireless networks 106 at the untuned site based on the wireless radio configuration settings associated with the identified class of wireless radios within AP devices of wireless networks 106 at the golden sites. RRM 136 may automatically configure the settings of the wireless radios within an AP device in response to installation of the AP device of wireless networks 106 at an untuned site using nominal configuration parameters. Alternatively, or additionally, RRM 136 may automatically configure or reconfigure the settings of the wireless radios within the AP device of wireless networks 106 after installation at the untuned site in response to detecting one or more trigger conditions.

Figure 2:
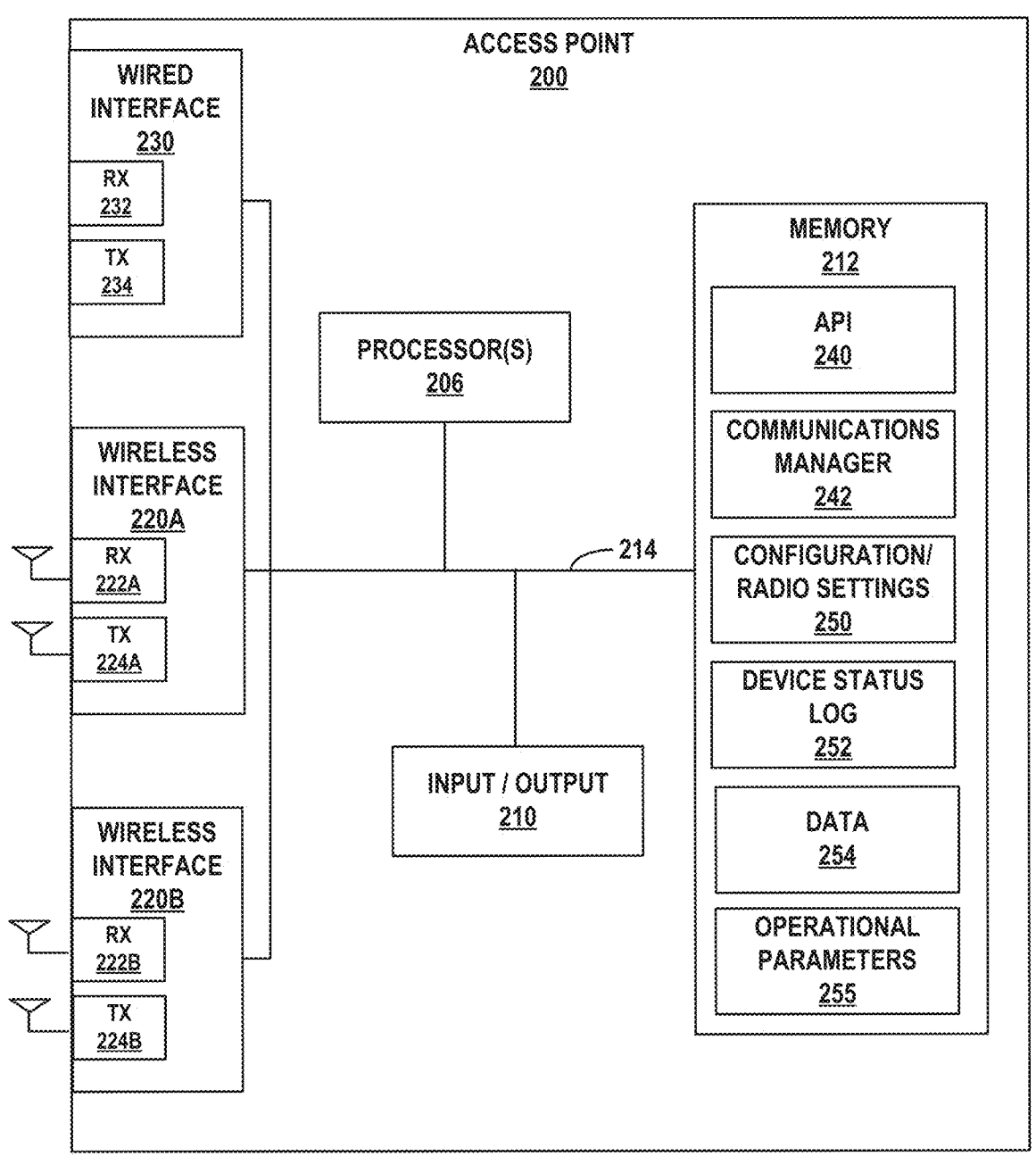
FIG. 2 is a block diagram of an example access point device, in accordance with one or more techniques of this disclosure.

FIG. 2 is a block diagram of an example access point device 200, in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 radio (e.g., 2.4 GHZ, 5 GHZ, and/or 6 GHZ) and second wireless interface 220B may include a Bluetooth radio and/or a Bluetooth Low Energy (BLE) radio. In other examples, access point 200 may include three wireless interfaces, e.g., two Wi-Fi 802.11 radios and one Bluetooth or BLE radio.

Processor(s) 206 are programmable hardware-based processors configured to execute software instructions, such as those used to define a software or computer program, stored to a computer-readable storage medium (e.g., memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein. Input/output (I/O) 210 represents physical hardware components that enable interaction with a user, such as buttons, a display, and the like. Although not shown, memory 212 typically stores executable software for controlling a user interface with respect to input received via I/O 210.

In the illustrated example of FIG. 2, memory 212 stores executable software including an application programming interface (API) 240, a communications manager 242, configuration/radio settings 250, a device status log 252, data storage 254, and operational parameters 255. Communications manager 242 includes program code that, when executed by processor(s) 206, allow access point 200 to communicate with client devices and/or network(s) via any of interface(s) 230 and/or 220A-220B. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Data 254 may store any data used and/or generated by access point 200, including data collected from client devices, e.g., UEs 148 from FIGS. 1A-1B, such as data used to calculate one or more SLE metrics. Access point 200 may measure and report network data from status log 252 and data 254 to an NMS, e.g., NMS 130 from FIGS. 1A-1B, or another computing device for cloud-based management of wireless networks.

Operational parameters 255 may store data indicative of current operating conditions of access point 200 and, in some examples, data indicative of conditions of the wireless networks and/or the site in which access point 200 is currently operating. Operational parameters 255 may include AP features of the wireless networks or sites in which access point 200 is operating, such as AP model or other data identifying access point 200 in the wireless network or at the site. Operational parameters 255 may further include client device behavior observed at access point 200, such as a number of client devices associated with access point 200, client device type, client device usage (e.g., number of packets received/sent to clients by access point 200, number of receive/send errors), client device roaming (e.g., number of mobility events), and/or client device temporal patterns. In further examples, operational parameters 255 may include configuration parameters at access point 200, such as available or supported channels, bandwidth, and/or power range. Access point 200 may transmit operational parameters 255 to the NMS or another computing device. In some examples, operational parameters 255 may include measurable parameters of access point 200 such as a number of receiving errors, a number of transmission errors, a number of transition errors, bandwidth used, and/or other measurable parameters. In some examples, operation parameters 255 may be reported along with the network data from status log 252 and data 254. In other examples, access point 200 may report operational parameters 255 to the NMS distinct from the network data.

Configuration/radio settings 250 include any device settings for access point 200 such as wireless radio settings for each of wireless interfaces 220A-220B. These settings may be configured manually or may be remotely monitored and managed by the NMS or another computing device to optimize wireless network performance on a scheduled, periodic (e.g., hourly, daily, weekly, monthly), based on a system trigger, or ad-hoc basis. For example, access point 200 may receive a configuration command that including an indication of values of one or more wireless radio configuration settings from the NMS (e.g., from RRM) via wired interface 230 and/or API 240. Processors 206 may execute the configuration command to activate or select values of one or more settings in configuration/radio settings 250 for each of wireless interfaces 220A-220B, as indicated by the configuration command.

In accordance with one or more techniques of this disclosure, configuration/radio settings 250) may include channel bandwidth settings of the wireless radios (i.e., wireless interfaces 220A-220B) within access point 200 that are automatically configured for each frequency band supported by access point 200 by a radio resource manager of the NMS, e.g., RRM 136 of FIGS. 1A-1B. In the event access point 200 is configured to communicate over multiple frequency bands, such as the 2.4 GHZ, 5 GHZ, and/or 6 GHz frequency bands, configuration/radio settings 250 may include a channel bandwidth setting for each of the frequency bands over which access point 200 is configured to communicate. For example, configuration/radio settings 250) may include a channel width selected from 20 MHZ, 40 MHz, or 80 MHz for the 5 GHz frequency range, and may include a channel width selected from 20 MHZ, 40 MHZ, 80 MHZ, or 160 MHz for the 6 GHz frequency range. In other examples, configuration/radio settings 250 may include other wireless radio settings for access point 200, such as transmission power settings per frequency band.

Figure 3A:
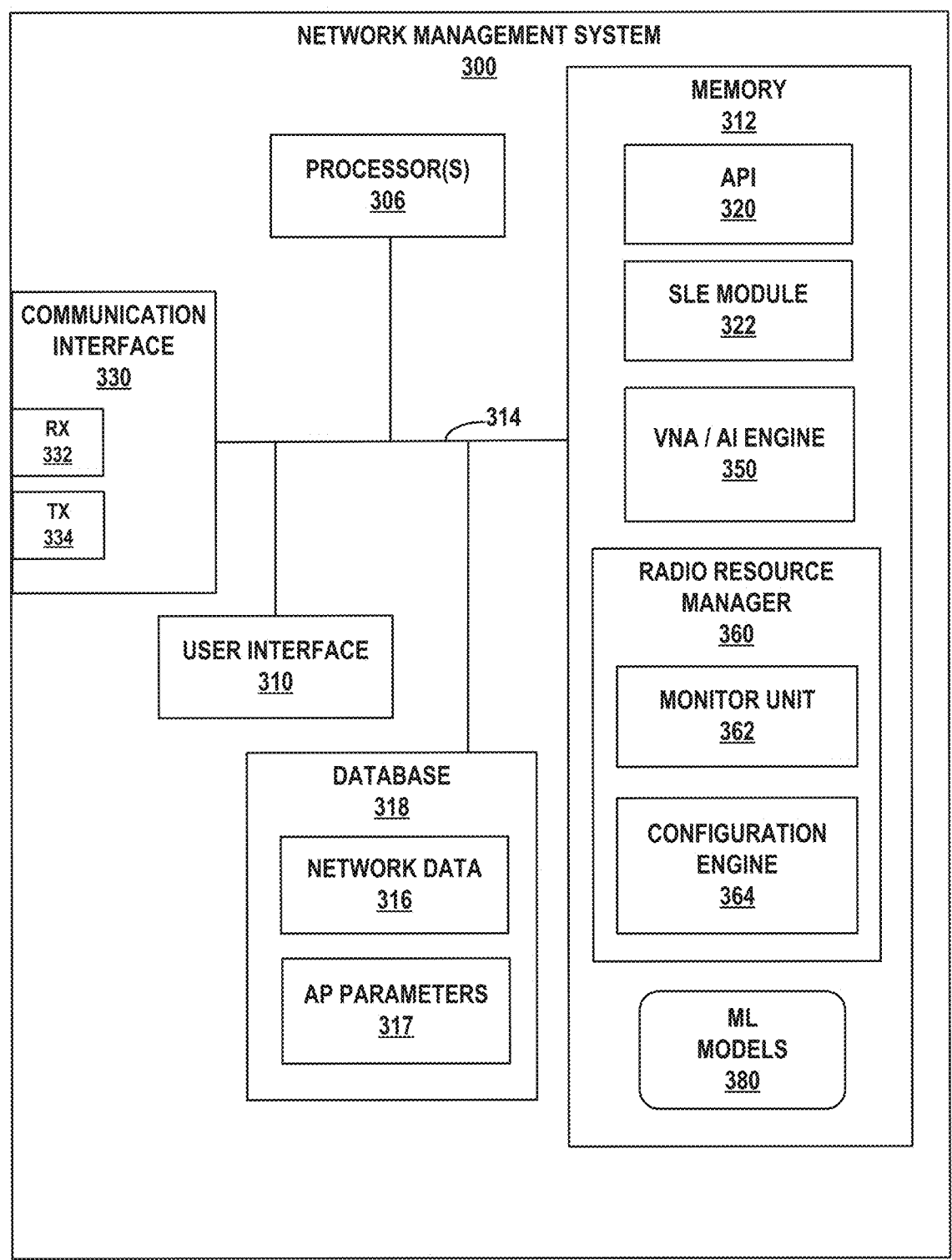
FIG. 3A is a block diagram of an example network management system including a radio resource manager, in accordance with one or more techniques of the disclosure.

FIG. 3A is a block diagram of an example network management system (NMS) 300, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communication interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and other network nodes, e.g., routers 187, within wireless network 106 and network 134 from FIGS. 1A-1B. NMS 300 may use the received data to calculate one or more SLE metrics, configure one or more device settings for the APs or other network devices, and/or update network data 316 and AP parameters 317 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communication interface 330 may include, for example, an Ethernet interface. Communication interface 330 couples NMS 300 to a network and/or the Internet, such as any of network(s) 134 as shown in FIGS. 1A-1B, and/or any local area networks. Communication interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems, e.g., routers 187, forming part of network system 100 such as shown in FIGS. 1A-1B. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data, network statistics, operational parameters, SLE-related data, or event data, received from one or more of client device client devices 148, APs 142, switches 146, or other network nodes, e.g., routers 187, from FIGS. 1A-1B, used by NMS 300 to remotely monitor the performance of wireless networks 106A-106N. The data and information received by NMS 300 may be stored as network data 316 in database 318. In some examples, in accordance with the techniques of this disclosure, received operational parameters indicative of current operating conditions of the APs and/or indicative of conditions of the wireless networks and/or the sites in which the APs are currently operating may be stored as AP parameters 317 in database 318. NMS 300 may further transmit data via communication interface 330 to any of network devices such as client devices 148, APs 142, switches 146, other network nodes, e.g., routers 187, within wireless network 106 and network 134, and/or admin device 111 to remotely manage wireless networks 106A-106N.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In the illustrated example of FIG. 3A, memory 312 includes an API 320, an SLE module 322, a virtual network assistant (VNA)/AI engine 350, and a radio resource management (RRM) 360. In accordance with the disclosed techniques, RRM 360 includes a monitor unit 362 and a configuration engine 364. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187, of FIGS. 1A-1B.

SLE module 322 enables set up and tracking of thresholds for SLE metrics for each network 106A-106N. SLE module 322 further analyzes SLE-related data collected by APs, such as any of APs 142 from client devices in each wireless network 106A-106N. For example, APs 142A collect SLE-related data from UEs 148A currently connected to wireless network 106A. The SLE-related data is transmitted to NMS 300, which executes SLE module 322 to determine one or more SLE metrics for wireless network 106A and for UEs 148A and/or APs 142A of wireless network 106A.

RRM 360 monitors one or more metrics and/or parameters for each site 102A-102N in order to learn and optimize the RF environment at each site. For example, RRM 360 may monitor SLE metrics, e.g., included in network data 316, for a wireless network 106A at a site 102A in order to identify potential issues with SLE coverage and/or capacity in the wireless network 106A and to make adjustments to the radio settings of the access points at site 102A to address the identified issues. For example, RRM 360 may determine channel and transmit power distribution across all APs 142 in each network 106A-106N. As another example, RRM 360) may monitor operational parameters of the APs 142, e.g., AP parameters 317, such as power, channel, bandwidth, and number of clients connected to each AP, at sites 102 in order to understand the conditions in which APs 142 are operating. RRM 360 may automatically change or update configurations of one or more APs 142 at sites 102 based on the operational parameters of the APs with an aim to provide an improved wireless experience for the user.

VNA/AI engine 350 analyzes the data received from one or more of client devices 148, APs 142, switches 146, or other network nodes, e.g., routers 187, from FIGS. 1A-1B, as well as its own data to identify when undesired to abnormal states are encountered at one of the network devices and/or invoke remedial actions. VNA/AI engine 350 may utilize, and in some cases train and/or maintain, one or more ML models 380 to identify and remediate any undesired or abnormal states. For example, VNA/AI engine 350 may identify a root cause of any undesired or abnormal states, e.g., any poor SLE metrics indicative of issues at one or more network devices. In addition, VNA/AI engine 350 may automatically invoke one or more corrective actions intended to address the identified root cause of the undesired or abnormal states. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

In accordance with one or more techniques of the disclosure, RRM 360 is further configured to automatically configure one or more settings of wireless radios within AP devices, e.g., APs 142/200, at a site based on wireless radio configuration settings for AP devices at manually tuned sites, i.e., golden sites. RRM 360 may automatically configure channel bandwidth settings of the wireless radios within the AP devices in order to optimize performance of the wireless networks at the site. In other examples, RRM 360 may automatically configure other wireless radio settings for AP devices, such as transmission power settings per frequency band.

The disclosed techniques utilize a few selected sites, e.g., golden site 102A, for which dedicated experts are employed to fine-tune the parameters of the sites' AP configurations, such as channel bandwidth configurations for supported frequency bands of APs of the golden sites. For example, assume that two large sites managed by NMS 300 are chosen as golden sites. Dedicated technical resources can be assigned to monitor the large wireless networks at the golden sites and adjust wireless radio settings, such as the channel bandwidth, for each AP. As such, the APs at the golden sites may be assumed to provide close to optimal performance and SLEs to the end users. RRM 360 then uses the configurations of the golden sites as templates for automating the configurations of other untuned sites, e.g., untuned site 102N, managed by NMS 300.

Monitor unit 362 of RRM 360 continuously monitors various operational parameters of APs 142 at sites 102, e.g., AP parameters 317. AP parameters 317 may include, but are not limited to, AP features of the wireless networks 106 or sites 102 (e.g., number of APs, AP models, AP density) and client device behavior observed at the APs 142 (e.g., a number of client devices associated with each AP, client device type, client device usage (e.g., number of packets received/sent to clients by each AP, number of receive/send errors), client device roaming (e.g., number of mobility events), speed of data transmission, client device temporal patterns, etc.). In further examples, AP parameters 317 may include configuration parameters at the APs 142 (e.g., channels, bandwidth, transmission power).

Configuration engine 364 of RRM 360 then identifies a class of wireless radios within AP devices at the golden sites, e.g., golden site 102A, that have similar AP parameters 317 as one or more wireless radios within an AP device at an untuned site, e.g., untuned site 102N. For example, for each wireless radio within each of the APs at the untuned site, configuration engine 364 may identify a class of wireless radios within APs at one of the golden sites that operates under similar conditions using ML model 380. Configuration engine 364 then automatically configures the wireless radio within the particular AP at the untuned site with the same wireless radio configuration settings e.g., channel bandwidth, as that of the corresponding matched class of wireless radios within APs at the golden site. In some examples, configuration engine 364 may automatically configure wireless radio settings individually for each AP at the untuned site, i.e., an AP-specific configuration. In other examples, configuration engine 364 may automatically configure wireless radio settings for all APs at the untuned site, i.e., a site-specific configuration.

In some examples, ML model 380) may comprise a supervised ML model that is trained, using training data comprising pre-collected, labeled operational parameters, e.g., AP parameters 317, of wireless networks at the golden sites, to determine optimal configuration settings for wireless radios within AP devices of wireless networks at untuned sites. The supervised ML model may comprise one of a logistical regression, naïve Bayesian, support vector machine (SVM), or the like. In some examples, ML model 380 may comprise a clustering model, such as a k-nearest neighbor (KNN) clustering model, as illustrated and described in more detail with respect to FIG. 3B. In other examples, ML model 380 may comprise an unsupervised ML model. Although not shown in FIG. 3A, in some examples, database 318 may store the training data and VNA/AI engine 350 or a dedicated AI/ML training module may be configured to train ML model 380 based on the training data.

Configuration engine 364 may automatically configure the parameter settings of the wireless radios within any newly installed AP device at an untuned site to a nominal set of values. After installation, monitor unit 362 may continue to monitor AP parameters 317 of both the untuned and tuned (i.e., golden) sites to detect the occurrence of certain conditions that trigger a reconfiguration of the wireless radio settings for one or more APs at the untuned site. For example, as monitor unit 362 detects differences to certain AP parameters 317 for the untuned site, e.g., detection that the certain operational parameter of a particular radio changed placing it in a different class, configuration engine 364 may be triggered to perform an automatic re-configuration of the APs at the untuned site in order to optimize the performance of the associated wireless networks for the new operating conditions. Configuration engine 364 may also be triggered to perform an automatic re-configuration of the APs at the untuned site in response to detection of a scheduled reconfiguration request, an ad-hoc reconfiguration request, or detection of at least one change to the wireless radio configuration settings associated with the golden sites.

Figure 3B:
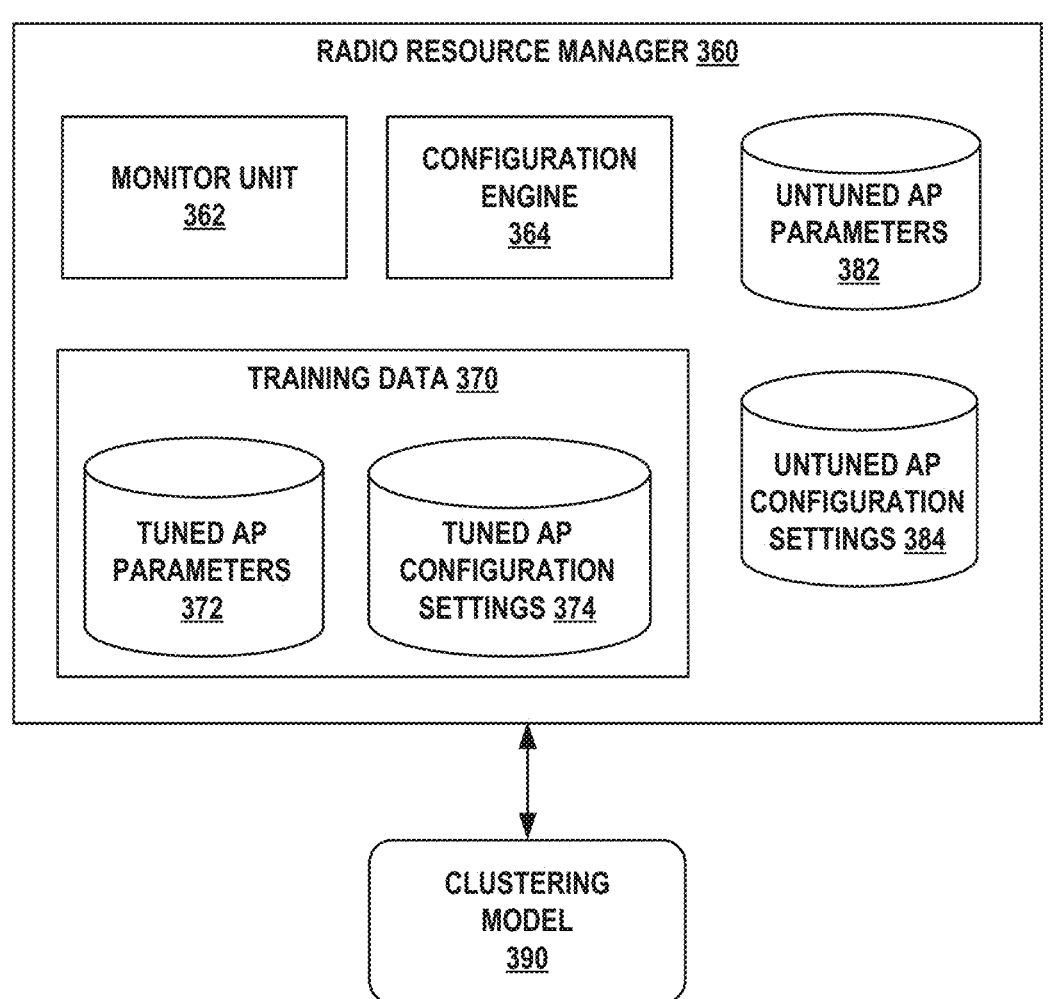
FIG. 3B is a block diagram of the radio resource manager from FIG. 3A in greater detail.

FIG. 3B is a block diagram of RRM 260 from FIG. 3A in greater detail. In the illustrated example, monitor unit 362 creates and/or maintains training data 370 for use in training and/or updating clustering or a similarity classification model 390. More specifically, monitoring unit 362 monitors tuned AP parameters 372 of AP devices at one or more golden sites, e.g., APs 142A at golden site 102A. Tuned AP parameters 372 may include the same type of operational parameters as included in AP parameters 317 for the golden sites. Monitoring unit 362 also monitors or detects tuned AP configuration settings 374, which include the wireless radio configuration settings (e.g., channel bandwidth settings and/or transmission power settings per frequency band,) for the AP devices at the golden sites. Training data 370 may include tuned AP parameters 372 of each AP device at the golden sites labeled with values of tuned AP configuration settings 374 associated with each AP device.

VNA/AI engine 350, or another module of NMS 300 or another computing device, may generate clustering model 390 by applying training data 370 to a classification algorithm, such as a k-nearest neighbor (KNN) algorithm. Clustering model 390 is trained to group tuned AP parameters 372 of the AP devices at the golden sites into two or more classes based on the values of the tuned AP configuration settings 374 associated with the AP devices at the golden sites. As one example, for channel bandwidth settings for the 5 GHZ frequency range of wireless networks, clustering model 390 may group one or more first wireless radios within APs at a golden site into a first class based the wireless radios having a channel bandwidth value of 20 MHZ, group one or more second wireless radios within APs at the golden site into a second class based the wireless radios having a channel bandwidth value of 40 MHZ, and group one or more third wireless radios within APs at the golden site into a third class based the wireless radios having a channel bandwidth value of 80 MHZ. Clustering model 390 may be trained to associate tuned AP parameters 372 of the wireless radios included in each class with the tuned AP configuration settings 374 of the wireless radios included in each class. Returning to the example of channel bandwidth settings, clustering model 390 may learn which channel bandwidth value in the 5 GHz frequency range provides close to optimal wireless network performance for certain operating conditions observed at the golden sites.

After training, clustering model 390 may be deployed for use by RRM 360. During operation, monitoring unit 362 monitors untuned AP operational parameters 382 of wireless radios within AP devices at one or more untuned sites, e.g., APs 142N at untuned site 102N. Untuned AP parameters 382 may include the same type of operational parameters as included in AP parameters 317 for the untuned sites. Configuration engine 364 applies untuned AP operational parameters 382 of a wireless radio within a particular AP device at an untuned site to clustering model 390 as input. Clustering model 390 determines to which class of the clustering model the operational parameters of the wireless radio within with untuned AP are similar and may also determine a level of similarity between untuned AP parameters 382 of the wireless radio within the particular AP device at the untuned site and tuned AP parameters 372 associated with each class of wireless radios within APs at the golden sites. Clustering model 390 identifies the class of wireless radios within APs at the golden sites that has a highest level of similarity with the operational parameters of the wireless radio within the particular AP device at the untuned site. VNA/AI engine 350), and specifically the clustering model 390, may then output an indication of the values of tuned AP configuration settings 374 associated with the identified class of wireless radios within AP devices in the golden site as optimal configuration setting for the wireless radio within the particular AP at the untuned site. The output of clustering model 390 may be stored in untuned AP configuration settings 384 associated with the AP devices at the untuned sites.

Returning again to the above example of channel bandwidth settings, clustering model 390 compares certain operational parameters of the wireless radio within the particular AP at the untuned site to the same type of operational parameters associated with each of the first class, the second class, and the third class of wireless radios within APs at the golden site. In some examples, input vectors associated with the operational parameters are provided to clustering model 390, which outputs an indication of which class the input vector (e.g., operational parameters of the particular AP at the untuned site) belongs. If clustering model 390 determines a closest match with the first class, clustering model 390 outputs an indication of a channel bandwidth value equal to 20 MHz as an optimal channel bandwidth setting for the wireless radios within the particular AP at the untuned site. If clustering model 390 determines a closest match with the second class, clustering model 390 outputs an indication of a channel bandwidth value equal to 40 MHz as an optimal channel bandwidth setting for the wireless radios within the particular AP at the untuned site. If clustering model 390 finds a closest match with the third class, clustering model 390 outputs an indication of a channel bandwidth value equal to 80 MHz as an optimal channel bandwidth setting for the wireless radios within the particular AP at the untuned site.

In this way, clustering model 390 classifies APs into categories based on operating conditions of the APs at untuned sites in order to recommend optimal wireless radio configuration settings for the APs at the untuned sites. In some examples, clustering model 390 may also enable mapping to vertical industries, if applicable, e.g., retail, education, healthcare, ecommerce, energy and utilities, and the like.

In some examples, configuration engine 364 may automatically reconfigure one or more wireless radios within the particular AP at the untuned site in response to differences/changes in untuned AP parameters 382 of the particular AP at the untuned site monitored by monitor unit 362, differences/changes in one or more of tuned AP configuration settings 374 associated with the golden sites, and/or scheduled or ad-hoc reconfiguration requests. For example, during operation of the particular AP device at the untuned site in accordance with the wireless radio configuration settings associated with the first identified class of wireless radios within APs at the golden sites, monitoring unit 362 may detect a trigger condition. In response to detection of the trigger condition, configuration engine 364 applies current untuned AP parameters 382 of the wireless radio within the particular AP device at the untuned site to clustering model 390 as input. Clustering model 390 may identify a different class of wireless radios within APs at the golden sites that now has a highest level of similarity with the current operational parameters of the wireless radio within the particular AP device at the untuned site. Clustering model 390 then outputs an indication of the values of tuned AP configuration settings 374 associated with the second identified class of wireless radios within AP devices as the current optimal configuration setting for the wireless radio within the particular AP at the untuned site.

Returning again to the above example of channel bandwidth settings, if based on the initial operating parameters of the wireless radio within the particular AP at the untuned site, clustering model 390 determines a closest match with the first class, clustering model 390 outputs an indication of a channel bandwidth value equal to 20 MHz as an optimal channel bandwidth setting for the wireless radios within the particular AP at the untuned site. Subsequently, if based on the current operating parameters of the wireless radio within the particular AP at the untuned site, clustering model 390 now determines a closest match with the second class, clustering model 390 outputs an indication of a channel bandwidth value equal to 40 MHz as an optimal channel bandwidth setting for the wireless radios within the particular AP at the untuned site. Configuration engine 364 may then automatically modify the configuration of the wireless radio within the particular AP at the untuned site from a channel bandwidth setting of 20 MHz for the 5 GHz frequency band to a channel bandwidth setting of 40 MHz for the 5 GHz frequency band.

Figure 4:
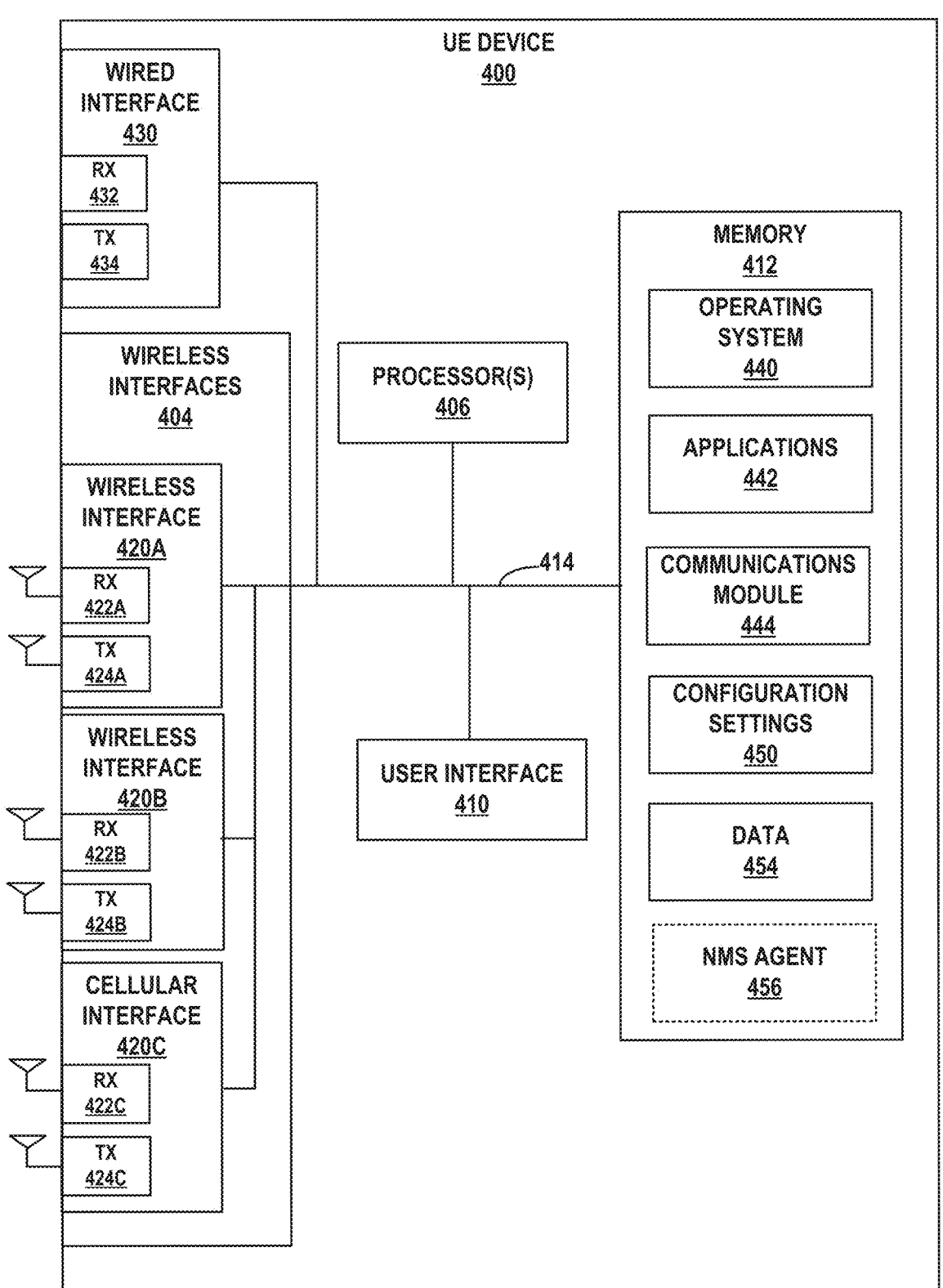
FIG. 4 is a block diagram of an example user equipment device, in accordance with one or more techniques of this disclosure.

FIG. 4 shows an example user equipment (UE) device 400, in accordance with one or more techniques of this disclosure. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In some examples, UE 400 may also include a wired client device, e.g., an IoT device such as a printer, a security sensor or device, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHZ, 5 GHZ, and/or 6 GHZ) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Data storage 454 may include, for example, a status/error log including a list of events specific to UE 400. The events may include a log of both normal events and error events according to a logging level based on instructions from NMS 130. Data storage 454 may store any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network data from data storage 454 to NMS 130. The network data may comprise telemetry data, network statistics, operational parameters, SLE-related data, and/or event data. The network data may include various parameters indicative of the performance and/or status of the wireless network. NMS 130 may determine one or more SLE metrics and store the SLE metrics as network data 137 (FIG. 1A) based on the SLE-related data received from the UEs or client devices in the wireless network.

Optionally, UE device 400 may include an NMS agent 456. NMS agent 456 is a software agent of NMS 130 that is installed on UE 400. In some examples, NMS agent 456 can be implemented as a software application running on UE 400. NMS agent 456 collects information including detailed client-device properties from UE 400, including insight into UE 400 roaming behaviors. The information provides insight into client roaming algorithms, because roaming is a client device decision. In some examples, NMS agent 456 may display the client-device properties on UE 400. NMS agent 456 sends the client device properties to NMS 130, via an AP device to which UE 400 is connected. NMS agent 456 can be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 can store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400) sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. The more details the NMS agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device can control whether the NMS agent 456 is enabled to report client device information to the NMS.

Figure 5:
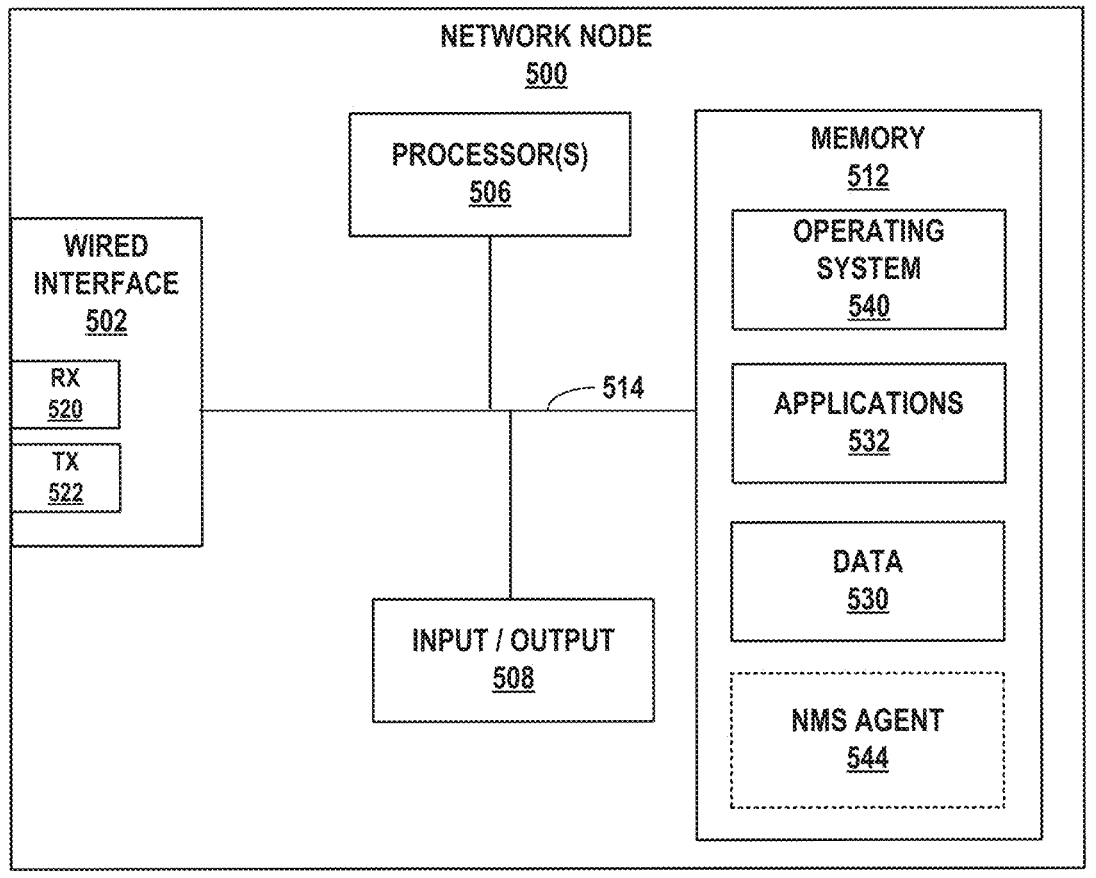
FIG. 5 is a block diagram of an example network node, in accordance with one or more techniques of the disclosure.

FIG. 5 is a block diagram illustrating an example network node 500, in accordance with one or more techniques of this disclosure. In one or more examples, the network node 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, network node 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples the network node 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

Memory 512 stores executable software applications 532, operating system 540) and data/information 530. Data 530 may include a system log and/or an error log that stores event data, including behavior data, for network node 500. In examples where network node 500 comprises a "third-party" network device, the same entity does not own or have access to both the APs or wired client-side devices and network node 500. As such, in the example where network node 500 is a third-party network device, NMS 130 does not receive, collect, or otherwise have access to the network data from network node 500.

In examples where network node 500 comprises a server, network node 500 may receive data and information, e.g., including operation related information, e.g., registration request, AAA services, DHCP requests, Simple Notification Service (SNS) lookups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client devices, e.g., IoT devices. For example, network node 500 may include multiple wired interfaces 502 and/or wired interface 502 may include multiple physical ports to connect to multiple APs or the other wired client devices within a site via respective Ethernet cables. In some examples, each of the APs or other wired client devices connected to network node 500 may access the wired network via wired interface 502 of network node 500. In some examples, one or more of the APs or other wired client devices connected to network node 500 may each draw power from network node 500 via the respective Ethernet cable and a Power over Ethernet (POE) port of wired interface 502.

In examples where network node 500 comprises a session-based router that employs a stateful, session-based routing scheme, network node 500 may be configured to independently perform path selection and traffic engineering. The use of session-based routing may enable network node 500 to eschew the use of a centralized controller, such as an SDN controller, to perform path selection and traffic engineering, and eschew the use of tunnels. In some examples, network node 500 may implement session-based routing as Secure Vector Routing (SVR), provided by Juniper Networks, Inc. In the case where network node 500 comprises a session-based router operating as a network gateway for a site of an enterprise network (e.g., router 187A of FIG. 1B), network node 500 may establish multiple peer paths (e.g., logical path 189 of FIG. 1B) over an underlying physical WAN (e.g., SD-WAN 177 of FIG. 1B) with one or more other session-based routers operating as network gateways for other sites of the enterprise network (e.g., router 187B of FIG. 1B). Network node 500, operating as a session-based router, may collect data at a peer path level, and report the peer path data to NMS 130.

In examples where network node 500 comprises a packet-based router, network node 500 may employ a packet- or flow-based routing scheme to forward packets according to defined network paths, e.g., established by a centralized controller that performs path selection and traffic engineering. In the case where network node 500 comprises a packet-based router operating as a network gateway for a site of an enterprise network (e.g., router 187A of FIG. 1B), network node 500 may establish multiple tunnels (e.g., logical path 189 of FIG. 1B) over an underlying physical WAN (e.g., SD-WAN 177 of FIG. 1B) with one or more other packet-based routers operating as network gateways for other sites of the enterprise network (e.g., router 187B of FIG. 1B). Network node 500, operating as a packet-based router, may collect data at a tunnel level, and the tunnel data may be retrieved by NMS 130 via an API or an open configuration protocol or the tunnel data may be reported to NMS 130 by NMS agent 544 or another module running on network node 500.

The data collected and reported by network node 500 may include periodically reported data and event-driven data. Network node 500 is configured to collect logical path statistics via bidirectional forwarding detection (BFD) probing and data extracted from messages and/or counters at the logical path (e.g., peer path or tunnel) level. In some examples, network node 500 is configured to collect statistics and/or sample other data according to a first periodic interval, e.g., every 3 seconds, every 5 seconds, etc. Network node 500 may store the collected and sampled data as path data, e.g., in a buffer.

In some examples, network node 500 optionally includes an NMS agent 544. NMS agent 544 may periodically create a package of the statistical data according to a second periodic interval, e.g., every 3 minutes. The collected and sampled data periodically reported in the package of statistical data may be referred to herein as "oc-stats." In some examples, the package of statistical data may also include details about clients connected to network node 500) and the associated client sessions. NMS agent 544 may then report the package of statistical data to NMS 130 in the cloud. In other examples, NMS 130 may request, retrieve, or otherwise receive the package of statistical data from network node 500 via an API, an open configuration protocol, or another of communication protocols. The package of statistical data created by NMS agent 544 or another module of network node 500 may include a header identifying network node 500 and the statistics and data samples for each of the logical paths from network node 500. In still other examples, NMS agent 544 reports event data to NMS 130 in the cloud in response to the occurrence of certain events at network node 500 as the events happen. The event-driven data may be referred to herein as "oc-events."

Figure 6:
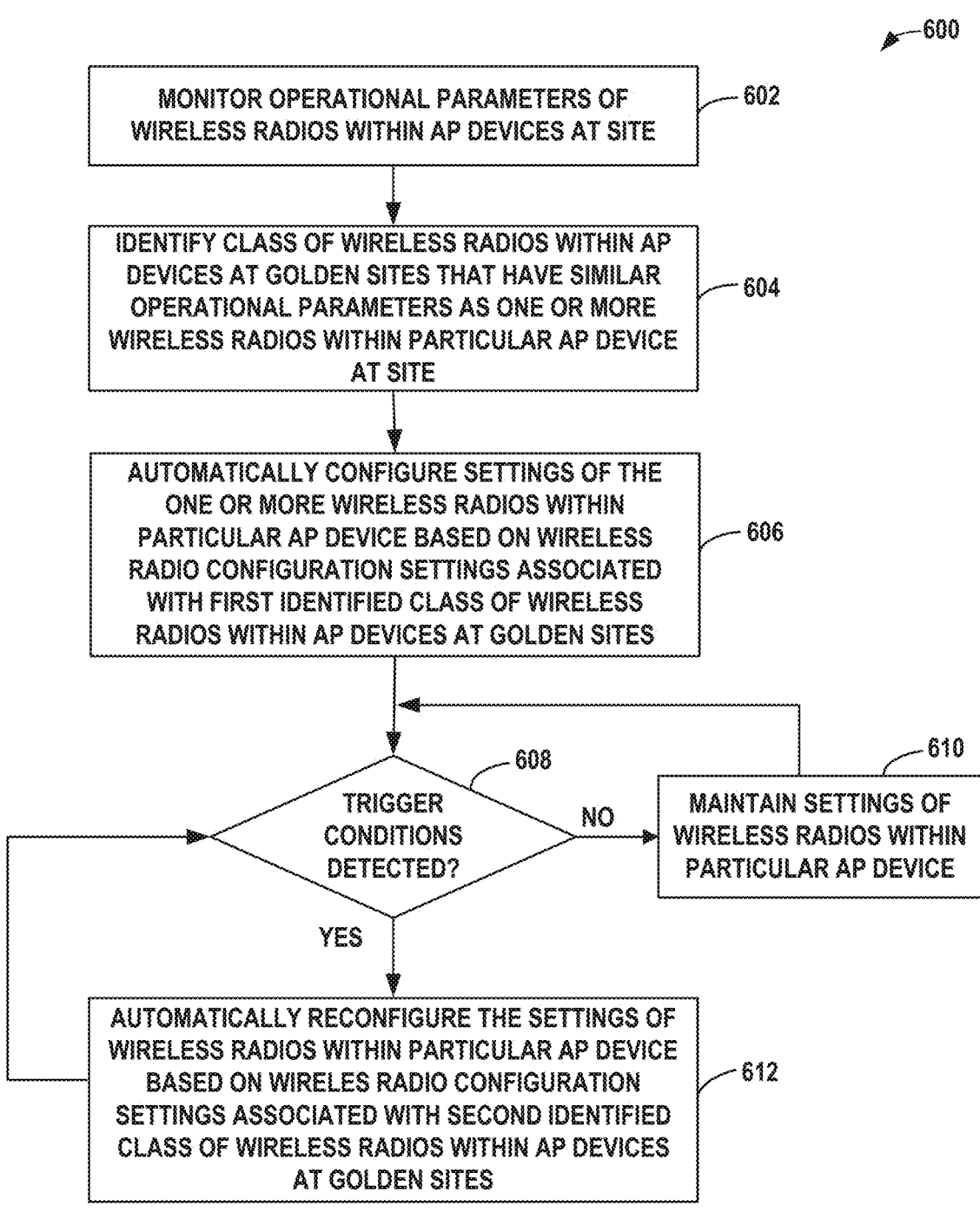
FIG. 6 is a flow chart illustrating an example operation of automatically configuring one or more settings of wireless radios within AP devices of wireless networks at a site, in accordance with one or more techniques of this disclosure.

FIG. 6 is a flow chart illustrating an example operation of automatically configuring one or more settings of wireless radios within AP devices of wireless networks at a site, in accordance with one or more techniques of this disclosure. The example operation of FIG. 6 is described herein with respect to NMS 300 of FIG. 3A and, more particularly, with respect to RRM 360 of FIGS. 3A-3B. In other examples, the operation of FIG. 6 may be performed by other computing devices, e.g., NMS 130 and RRM 136 of FIGS. 1A-1B.

Monitor unit 362 of RRM 360 monitors operational parameters of wireless radios within a plurality of AP devices of wireless networks at a site, e.g., APs 148N of wireless network 106N at site 102N from FIG. 1A (602). The operational parameters may include, but are not limited to, AP features of the wireless networks or sites and client device behavior observed at the AP devices. In addition to monitoring the operational parameters of the AP devices at the site, monitor unit 362 may monitor operational parameters of wireless radios within a plurality of AP devices of wireless networks at one or more golden sites.

A "golden site," as used herein, comprises a manually tuned site in which wireless radio configuration settings for the AP devices at the golden site are manually adjusted to optimize the associated wireless networks. As described in more detail above with respect to FIG. 3B, monitor unit 362, or another module of NMS 300 or another computing device, may create training data 370 based on the wireless radio configuration settings for the AP devices at the golden sites. Training data 370 may include the operational parameters of the wireless radios within each AP device of the plurality of AP devices at the golden sites labeled with values of wireless radio configuration settings associated with each wireless radio within each AP device. VNA/AI engine 350, or another module of NMS 300 or another computing device, may train clustering model 390 by applying training data 370 to a classification algorithm. Clustering model 390 is trained to group the operational parameters of the wireless radios within the AP devices at the golden sites into two or more classes based on the values of the wireless radio configuration settings associated with the wireless radios within the AP devices at the golden sites.

Configuration engine 364 of RRM 360 identifies a class of wireless radios within AP devices at golden sites, e.g., site 102A from FIG. 1A, that has similar operational parameters to one or more wireless radios within a particular AP device at the untuned site (604). For example, configuration engine 364 may apply, as input to clustering model 390, the operational parameters of the one or more wireless radios within the particular AP device at the untuned site. Clustering model 390 is trained to determine the class of wireless radios within APs from the golden site that operates under similar operational parameters to the operational parameters under which the one or more wireless radios within the AP from the untuned site operate and in some cases also a level of similarity between the operational parameters of the one or more wireless radios within the particular AP device at the untuned site and the operational parameters associated with each class of a plurality of classes of the wireless radios within the AP devices at the golden sites. Configuration engine 364 subsequently receives, as output from clustering model 390, an indication of values of the wireless radio configuration parameter settings associated with the class of wireless radios within AP devices at the golden sites identified as having a highest level of similarity with the operational parameters of one or more wireless radios within the particular AP device at the untuned site from among the plurality of classes of wireless radios within AP devices at the golden sites.

Configuration engine 364 then automatically configures one or more settings of the one or more wireless radios within the particular AP device at the untuned site based on wireless radio configuration settings associated with the first identified class of wireless radios within AP devices at the golden sites (606). In some scenarios, to automatically configure the one or more settings of the wireless radios within the particular AP device at the untuned site, configuration engine 365 sends, to the particular AP device at the untuned site, a configuration command including an indication of values of the wireless radio configuration parameter settings associated with the identified class of wireless radios within AP devices at the golden sites. In other scenarios, to automatically configure the one or more settings of the wireless radios within the particular AP device at the untuned site, configuration engine 364 outputs a configuration recommendation for the particular AP device at the site to an administrator of the site, e.g., via admin device 111 from FIG. 1A, where the configuration recommendation includes an indication of values of the wireless radio configuration settings associated with the identified class of wireless radios within AP devices at the golden sites.

The one or more settings of the wireless radios within the particular AP device to be configured may be channel bandwidth settings. As one example, configuration engine 364 may automatically configure the channel bandwidth settings of the wireless radios within the particular AP device to be equal to one of 20 MHZ, 40 MHZ, or 80 MHz for a 5 GHZ frequency range of the wireless networks. As another example, configuration engine 364 may automatically configure the channel bandwidth settings of the wireless radios within the particular AP device to be equal to one of 20 MHZ, 40 MHZ, 80 MHZ, or 160 MHz for a 6 GHz frequency range of the wireless networks. In other examples, the one or more settings of the wireless radios within the particular AP device to be configured may be transmission power settings per frequency band.

RRM 360 may initially configure the settings of the wireless radios within the particular AP device to nominal values during installation of the AP device at the untuned site. Subsequently, configuration engine 364 may automatically configure the settings of the wireless radios within the particular AP device in response to installation of the particular AP device at the site, e.g., after a period of time has passed during which monitor unit 362 monitors the operational parameters of the particular AP device and the wireless radios within the particular AP device. After automatic configuration, monitor unit 362 may continue to monitor the operational parameters of the AP devices at both the untuned and tuned (i.e., golden) sites, along with other data, to detect the occurrence of certain conditions that trigger a reconfiguration of the wireless radio settings for the particular AP device. In some examples, a triggering condition may be a scheduled reconfiguration request that may occur periodically, e.g., weekly or monthly. In other examples, a triggering condition may be an ad-hoc reconfiguration request that is manually initiated by an administrator of the site. e.g., via admin device 111 from FIG. 1A. In additional examples, while continuing to monitor the operational parameters of the wireless radios within the AP devices at the site, monitor unit 364 may detect one or more triggering conditions based on detecting at least one difference/change in the operational parameters of the wireless radios within the particular AP device at the site (e.g., whether a wireless radio within the particular AP device is still operating under the same or similar operational parameters as the class to which the wireless radio within the particular AP device was previously classified). In further examples, while continuing to monitor the operational parameters of the AP devices at the golden sites, monitor unit 362 may detect one or more triggering conditions based on detecting at least one difference/change to the wireless radio configuration settings associated with the first identified class of wireless radios within AP devices at the golden sites.

If triggering conditions are not detected (NO branch of 608), configuration engine 364 may maintain the current settings of the wireless radios within the particular AP device (610), and monitor unit 362 may continue its monitoring. In response to detecting one or more triggering conditions (YES branch of 608), configuration engine 364 may automatically reconfigure the settings of the wireless radios within the particular AP device at the site based on wireless radio configuration settings associated with a second identified class of wireless radios within AP devices at the golden sites (612). In some scenarios, the second identified class may be the same class of wireless radios within AP devices at the golden sites as the first identified class. In other scenarios, the second identified class may be a different class of wireless radios within AP devices at the golden sites than the first identified class.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
a memory; and
one or more processors in communication with the memory and configured to:
    monitor operational parameters of wireless radios within a plurality of access point (AP) devices of wireless networks at a site;
    identify a class of wireless radios within AP devices at one or more golden sites based on a level of similarity between operational parameters associated with each class of a plurality of classes of wireless radios within AP devices at the one or more golden sites and the operational parameters of one or more wireless radio within a particular AP device at the site, wherein each golden site of the one or more golden sites is a tuned site, and wherein the one or more golden sites do not include the site; and
    automatically configure one or more settings of the one or more wireless radios within the particular AP device at the site based on wireless radio configuration settings associated with the identified class of wireless radios within AP devices at the one or more golden sites.

2. The system of claim 1, wherein to automatically configure the one or more settings of the one or more wireless radios within the particular AP device, the one or more processors are configured to automatically configure channel bandwidth of the one or more wireless radios within the particular AP device.

3. The system of claim 2, wherein to automatically configure the channel bandwidth settings, the one or more processors are configured to automatically configure the channel bandwidth settings of the one or more wireless radios within the particular AP device to be equal to:

one of 20 MHz, 40 MHz, or 80 MHz for a 5 GHz frequency range of the wireless networks; or one of 20 MHz, 40 MHz, 80 MHZ, or 160 MHz for a 6 GHz frequency range of the wireless networks.

4. The system of claim 1, wherein, to identify the class of wireless radios within AP devices at the one or more golden sites based on a level of similarity to the operational parameters of the one or more wireless radios within the particular AP device at the site, the one or more processors are configured to:

apply, as input to a clustering model generated using machine learning techniques, the operational parameters of the one or more wireless radios within the particular AP device at the site, wherein the clustering model is configured to determine the level of similarity between the operational parameters of the one or more wireless radios within the particular AP device at the site and the operational parameters associated with each class of the plurality of classes of wireless radios within AP devices at the one or more golden sites; and receive, as output from the clustering model, an indication of values of the wireless radio configuration settings associated with the class of wireless radios within AP devices at the one or more golden sites identified as having a highest level of similarity with the operational parameters of the one or more wireless radios within the particular AP device at the site from among the plurality of classes of wireless radios within AP devices at the one or more golden sites.

5. The system of claim 1, wherein, to automatically configure the one or more settings of the one or more wireless radios within the particular AP device at the site, the one or more processors are configured to send, to the particular AP device at the site, a configuration command including an indication of values of the wireless radio configuration settings associated with the identified class of wireless radios within AP devices at the one or more golden sites.

6. The system of claim 1, wherein, to automatically configure the one or more settings of the one or more wireless radios within the particular AP device at the site, the one or more processors are configured to output a configuration recommendation for the particular AP device at the site to an administrator of the site, the configuration recommendation including an indication of values of the wireless radio configuration settings associated with the identified class of wireless radios within AP devices at the one or more golden sites.

7. The system of claim 1, wherein the one or more processors are configured to monitor parameters of wireless radios within a plurality of AP devices of wireless networks at the one or more golden sites, wherein each golden site of the one or more golden sites comprises a manually tuned site in which wireless radio configuration settings for the AP devices at the golden site are manually adjusted to optimize the associated wireless networks.

8. The system of claim 7, wherein the one or more processors are configured to:

create training data based on the wireless radio configuration settings for the AP devices at the one or more golden sites, wherein the training data comprises the operational parameters of the wireless radios within each AP device of the plurality of AP devices at the one or more golden sites labeled with values of wireless radio configuration settings associated with each wireless radio within each AP device; and generate a clustering model by applying the training data to a classification algorithm, wherein the clustering model is configured to group the operational parameters of the wireless radios within the AP devices at the one or more golden sites into two or more classes based on the values of the wireless radio configuration settings associated with the wireless radios within the AP devices at the one or more golden sites.

9. The system of claim 1, wherein the one or more settings of the one or more wireless radios within the particular AP device are automatically configured in response to installation of the particular AP device at the site.

10. The system of claim 1, wherein the identified class of wireless radios within AP devices at the one or more golden sites comprises a first identified class, and wherein the one or more processors are configured to, in response to one or more triggering conditions, automatically reconfigure the one or more settings of the one or more wireless radios within the particular AP device at the site based on wireless radio configuration settings associated with a second identified class of wireless radios within AP devices at the one or more golden sites, wherein the second identified class is one of the first identified class or a different class.

11. The system of claim 10, wherein the one or more triggering conditions comprise a scheduled or ad-hoc reconfiguration request.

12. The system of claim 10, wherein the one or more processors are configured to:

continue monitoring the operational parameters of the wireless radios within the plurality of AP devices at the site; and detect the one or more triggering conditions based on detecting at least one difference or change in the operational parameters of the one or more wireless radios within the particular AP device at the site.

13. The system of claim 10, wherein the one or more processors are configured to detect the one or more triggering conditions based on detecting at least one change to the wireless radio configuration settings associated with the identified class of wireless radios within AP devices at the one or more golden sites.

14. A method comprising:

monitoring, by a computing system, operational parameters of wireless radios within a plurality of access point (AP) devices of wireless networks at a site;

identifying a class of wireless radios within AP devices at one or more golden sites based on a level of similarity between operational parameters associated with each class of a plurality of classes of wireless radios within AP devices at the one or more golden sites and the operational parameters of one or more wireless radios within a particular AP device at the site, wherein each golden site of the one or more golden sites is a tuned site, and wherein the one or more golden sites do not include the site; and automatically configuring one or more settings of the one or more wireless radios within the particular AP device at the site based on wireless radio configuration settings associated with the identified class of wireless radios within AP devices at the one or more golden sites.

15. The method of claim 14, wherein automatically configuring the one or more settings of the one or more wireless radios within the particular AP device comprises automatically configuring channel bandwidth settings of the one or more wireless radios within the particular AP device.

16. The method of claim 14, wherein identifying the class of wireless radios within AP devices at the one or more golden sites based on a level of similarity to the operational parameters of the one or more wireless radios within the particular AP device at the site comprises:

applying, as input to a clustering model generated using machine learning techniques, the operational parameters of the one or more wireless radios within the particular AP device at the site, wherein the clustering model is configured to determine the level of similarity between the operational parameters of the one or more wireless radios within the particular AP device at the site and the operational parameters associated with each class of the plurality of classes of wireless radios within AP devices at the one or more golden sites; and receiving, as output from the clustering model, an indication of values of the wireless radio configuration settings associated with the class of wireless radios within AP devices at the one or more golden sites identified as having a highest level of similarity with the operational parameters of the one or more wireless radios within the particular AP device at the site from among the plurality of classes of wireless radios within AP devices at the one or more golden sites.

17. The method of claim 14, wherein automatically configuring the one or more settings of the wireless radios within the particular AP device at the site comprises sending, to the particular AP device at the site, a configuration command including an indication of values of the wireless radio configuration settings associated with the identified class of wireless radios within AP devices at the one or more golden sites.

18. The method of claim 14, further comprising:

monitoring operational parameters of wireless radios within a plurality of AP devices of wireless networks at the one or more golden sites, wherein each golden site of the one or more golden sites is a manually tuned site for which wireless radio configuration settings for the wireless radios within the AP devices at the golden site are manually adjusted to optimize the associated wireless networks;

creating training data based on the wireless radio configuration settings for the wireless radios within the AP devices at the one or more golden sites, wherein the training data comprises the operational parameters of the wireless radios within each AP device of the plurality of AP devices at the golden sites labeled with values of wireless radio configuration settings associated with each wireless radio within each AP device; and generating a clustering model by applying the training data to a classification algorithm, wherein the clustering model is configured to group the operational parameters of the wireless radios within the AP devices at the one or more golden sites into two or more classes based on the values of the wireless radio configuration settings associated with the wireless radios within the AP devices at the one or more golden sites.

19. The method of claim 14, wherein the identified class of wireless radios within AP devices at the one or more golden sites comprises a first identified class, and wherein the method further comprises, in response to one or more triggering conditions, automatically reconfiguring the one or more settings of the one or more wireless radios within the particular AP device at the site based on wireless radio configuration settings associated with a second identified class of wireless radios within AP devices at the one or more golden sites, wherein the second identified class is one of the first identified class or a different class.

20. Non-transitory computer-readable media storing instructions that, when executed, cause one or more processors to:

monitor operational parameters of wireless radios within a plurality of access point (AP) devices of wireless networks at a site;

identify a class of wireless radios within AP devices at one or more golden sites based on a level of similarity between operational parameters associated with each class of a plurality of classes of wireless radios within AP devices at the one or more golden sites and the operational parameters of one or more wireless radios within a particular AP device at the site, wherein each golden site of the one or more golden sites is a tuned site, and wherein the one or more golden sites do not include the site; and automatically configure one or more settings of the one or more wireless radios within the particular AP device at the site based on wireless radio configuration settings associated with the identified class of wireless radios within AP devices at the one or more golden sites.

* * * * *